(12) United States Patent
Bjork

(10) Patent No.: US 8,955,395 B2
(45) Date of Patent: Feb. 17, 2015

(54) MAGNETO CYCLIST POWER SENSOR

(71) Applicant: Ronald Greggory Bjork, San Rafael, CA (US)

(72) Inventor: Ronald Greggory Bjork, San Rafael, CA (US)

(73) Assignee: Ronald Greggory Bjork, San Rafael, CA (US)

( * ) Notice: Subject to any disclaimer, the term of this patent is extended or adjusted under 35 U.S.C. 154(b) by 0 days.

(21) Appl. No.: 13/898,506

(22) Filed: May 21, 2013

(65) Prior Publication Data
US 2014/0224039 A1  Aug. 14, 2014

Related U.S. Application Data

(60) Provisional application No. 61/651,031, filed on May 24, 2012.

(51) Int. Cl.
*G01L 3/02* (2006.01)
*G01L 3/24* (2006.01)
*B62J 99/00* (2009.01)

(52) U.S. Cl.
CPC . *G01L 3/24* (2013.01); *B62J 99/00* (2013.01); *B62J 2099/002* (2013.01)
USPC .................................................. 73/862.191

(58) Field of Classification Search
CPC ......... G01L 3/101; F16H 59/16; F16H 55/56; F16H 61/0437; F16H 61/66272; B62K 2207/00
USPC ....................................................... 73/862.191
See application file for complete search history.

(56) References Cited

U.S. PATENT DOCUMENTS

| | | | |
|---|---|---|---|
| 2004/0176895 A1* | 9/2004 | Takeda et al. | 701/51 |
| 2012/0252544 A1* | 10/2012 | Yuen | 455/575.8 |
| 2012/0261895 A1* | 10/2012 | Cote et al. | 280/281.1 |
| 2013/0090196 A1* | 4/2013 | Yamaguchi et al. | 474/80 |
| 2014/0135612 A1* | 5/2014 | Yuen et al. | 600/407 |

* cited by examiner

*Primary Examiner* — Lisa Caputo
*Assistant Examiner* — Jamel Williams

(57) ABSTRACT

The "Magneto Cyclist Power Sensor" is a device that computes "cyclist performance" values of pedal power, pedal force, cycle speed, and used gear position of a bicycle using the a aggregated signals from several vibration sensors that are a part of an assembly attached to the bicycle front derailleur. This device, working in conjunction with data from the internet and the cyclist Bluetooth or USB connected phone, is calibrated using known geographic topography of the riders location, prior information about the particulars of the bicycle (make, model and size) and past riding logs recorded by the device. The "cyclist performance values" can be used for providing the cyclist with a display of the computed values on their phone. The device attached to the front derailleur is composed of magnets, inductors, data acquisition and processing unit. Being attached to the derailleur, the device magnets and inductors move with the chain as the chain moves from gear to gear (also called sprocket).

4 Claims, 5 Drawing Sheets

Figure 1A:
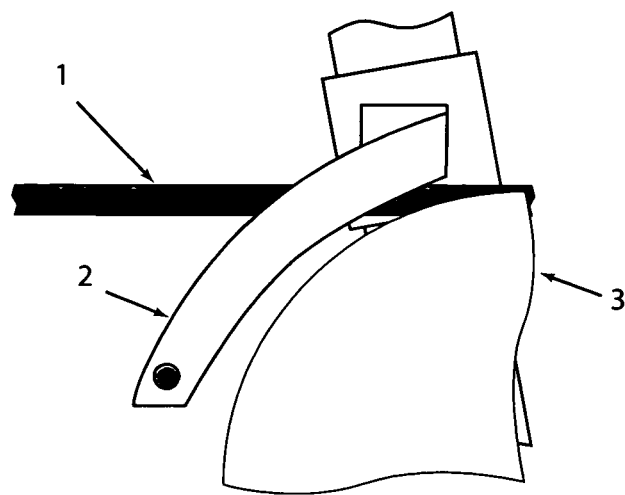

$$Frequency = \left(\frac{Wave\ Speed}{Wave\ Length}\right) = \left(\frac{1}{Wave\ Length}\right) * \sqrt{\frac{Tension\ of\ string}{mass\ density\ of\ string}}$$

FIG 4

MAGNETO CYCLIST POWER SENSOR

CROSS-REFERENCE TO RELATED APPLICATIONS

Reference to Earlier Provisional Patent

EFS ID: 12853192
Application Number: 61/651,031
Date Filed May 24, 2012
Title: Magneto Cyclist Power Sensor

STATEMENT REGARDING FEDERALLY SPONSORED RESEARCH AGREEMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURE BY THE INVENTOR OR A JOINT INVENTOR

Not Applicable

BACKGROUND OF THE INVENTION

Currently there exist no bicycle accessory that can measure the cyclist power output without requiring bike disassembly and significant modification to the existing components on the bike. This generally requires a bike mechanic to make this change and can be costly. Also this generally requires, some custom version of a large mechanical and expensive part of the bike, such as the pedal crankshaft or rear wheel hub. Other products include chain tensioners in their design—again expensive, unreliable and intrusive. The device described in this document does not have these drawbacks. I arrived on the idea of this device invention while pondering what I might show at an upcoming "Maker Faire" in San Mateo Calif. in May 2012. It is a result of an interest in bicycling, mobile technology and having a friend, with whom I was co-sponsoring a "Meetup" and spent time with discussing automobile gas mileage measurement though the automobile CAN bus. This invention is a result of a convergence of those ideas and activities.

BRIEF SUMMARY OF THE INVENTION

Device is used to detect rate of chain movement and its vibration frequency/wavespeed (depends on tension and therefore cyclist pedal force) so as to determine cyclist pedaling power.
Use:
This device is a sensor whose output can be used for providing the cyclist with a display of the power he/she is delivering to the wheels of the bicycle while he/she is riding. It can also be used to determine bike gear selection and bike ground speed.
Construction of Device:
It is a sensor composed of magnet(s)(items 3 and 4 of FIG. 2B) and inductor(s), (item 1 of FIG. 2A or items 5 and 6 of FIG. 2B), which attaches to a bikes front derailleur (see FIGS. 1A and 1B). Attaching the magnets and inductors to the derailleur causes them to move with the chain as the chain moves from gear to gear (also called sprocket) on the bike front gear assembly. The inductors are wired to a voltage amplifier (part of electronic support—item 2 of FIG. 2A) for amplification and digitizing. There is at minimum two sensors for sensing chain vibration and one sensor (item 9 FIG. 2A) for bike vibration.
System for Measurement of Power:
Voltage output of the sensor is amplified, digitized (analog to digital converter) and analyzed by a small computing device (on the bike). From this, the computing device computes the power being transmitted by the chain to the rear bike wheel.

BRIEF DESCRIPTION OF THE SEVERAL VIEWS OF THE DRAWING(S)

Figure 1B:
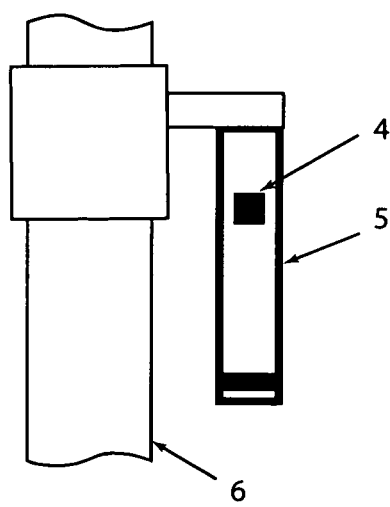
Figure 2A:
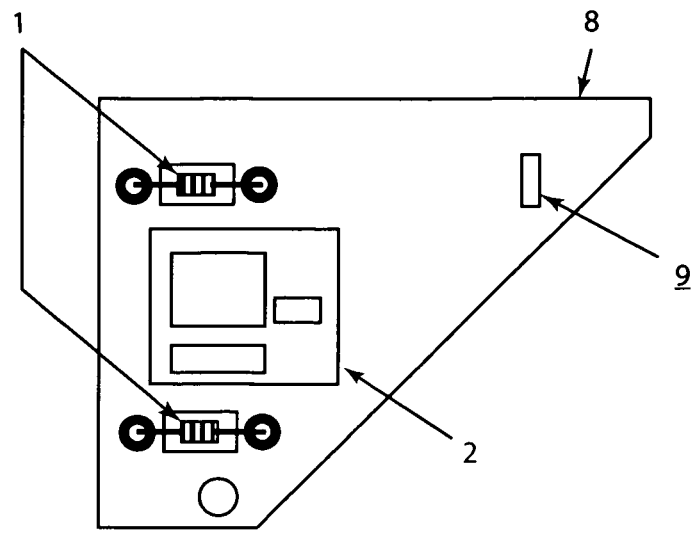
Figure 2B:
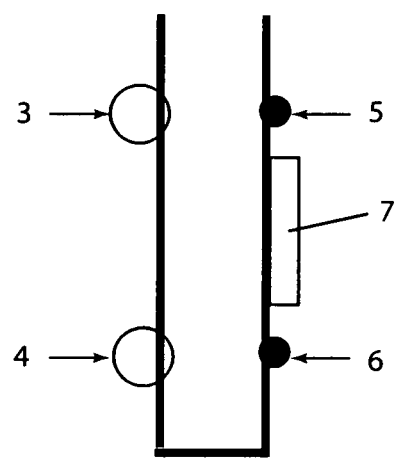
Figure 3A:
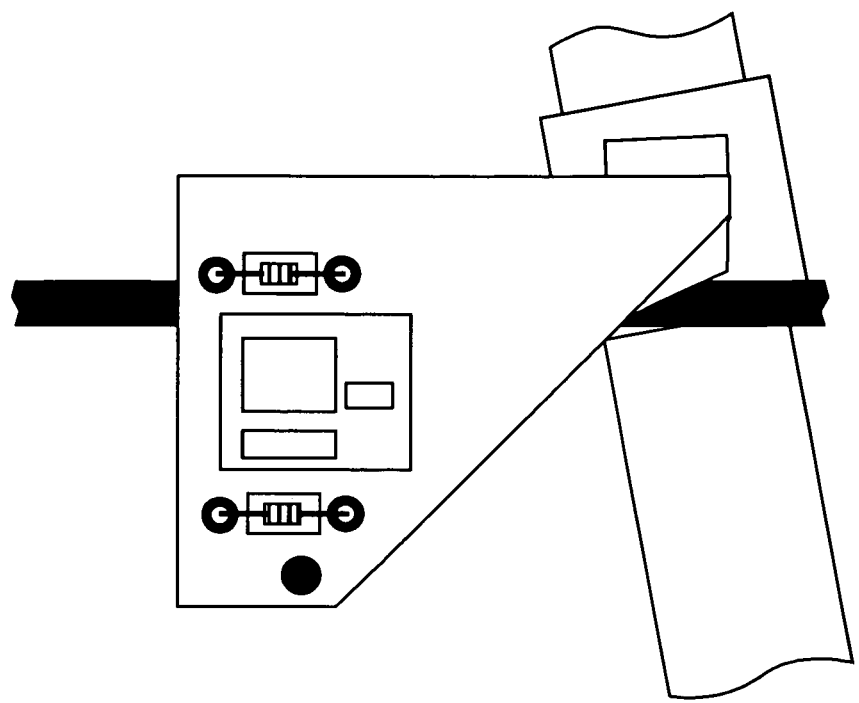
Figure 3B:
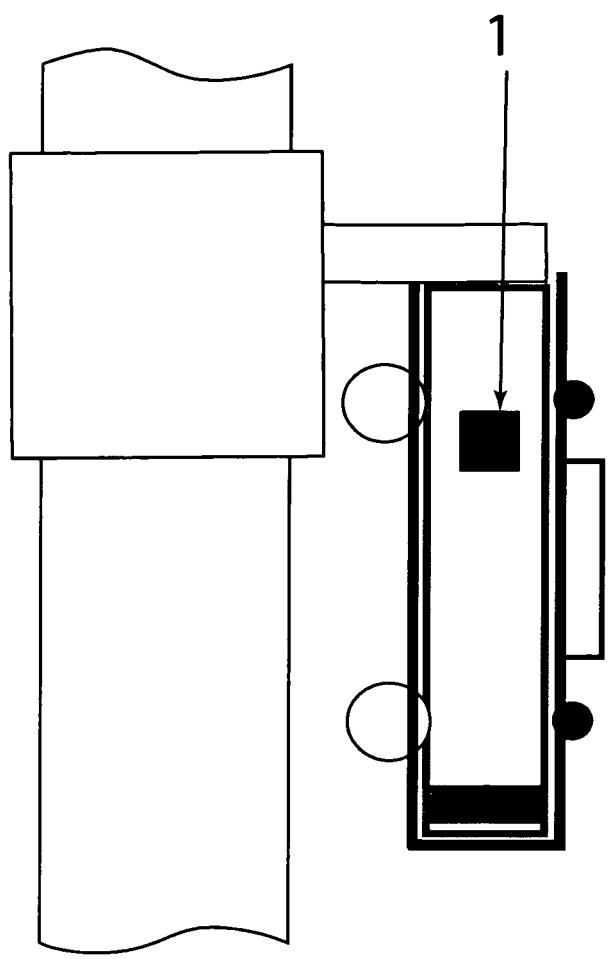

FIGS. 1A and 1B shows a generic unmodified front derailleur assembly representation. It shows the side and front views (respectively) of a simplified cutaway view of the relevant portion of a typical bicycle that includes the front derailleur, its mounting, the bike chain that passes through it, a semitransparent view of a front gear (side view only) sprocket around which the bike chain rides, and bike seat tube. The contents of these figures are the following:
Item 1 is a section of the bike chain.
Item 2 is the derailleur cage,
item 3 is a quarter section of a front sprocket,
item 4 is the bike chain,
item 5 is the derailleur cage,
item 6 is a section of bike seat tube.
FIGS. 2A and 2B shows the side and front views (respectively) of the "Magneto Cyclist Power Sensor". Each view shows three types of components: the triangular mounting plate, item 8, two Faraday magnetic field sensors (consists of a permanent magnet and inductor pair, items 3 and 5, and the pair items 4 and 6) and sensor support electronics unit (consisting of ADAC, digital signal processor (dsp) chip and Bluetooth transceiver), item 2 and item 7. The side view does not show the magnets since they are behind. Item 9 is the bike vibration sensor.
FIGS. 3A and 3B shows the side and front views (respectively) of the "Magneto Cyclist Power Sensor" attached to the bike front derailleur assembly. (Front sprocket not shown). Item 1 in FIG. 3B is the bike chain.
FIG. 4 are the classic physics equations describing the vibrations of a simple stretched string (such as a Guitar string) which assumes the tension is constant throughout the cycle of vibration and the transverse displacement is small.

DETAILED DESCRIPTION OF THE INVENTION

The sensor is composed of a magnet (permanent or electrical) which produces a magnetic field, and an inductor that's close enough to be within this magnetic field. In FIG. 2A and FIG. 2B the arrangement of the magnets (items 3 and 4) and inductors (items 1, 5 and 6) are shown.
Since the magnet is mounted very near to the bike chain (facilitated by being mounted on the front derailleur), the chain (which is a ferrous metal) will alter the path and strength of the magnetic field lines. See FIGS. 3A and 3B for illustration of where the sensor assembly is mounted relative to the bike chain. The sensor can be used to measure both chain speed and tension (a force) and thus rate of energy (work=force*distance).

Power=work/time=force*distance/time=chain tension*chain speed

Details for each are described in the following two paragraphs.

Chain Speed:

Because the chain is moving and varies in material density (due to chain links construction of outer links and pins), the magnetic field will vary over time. Since the inductors are also part of the sensor and are thus in close proximity of both the chain and the magnet(s), the magnet's magnetic field that are passing through the inductors, will also vary over time. By Faradays Law of magnetism, a voltage will be induced in the inductors. Since the spacing of the chain links are known, this voltage can be used to detect the speed at which the chain is moving.

Chain Tension:

The energy for excitation of the chain comes mostly from road vibration originating from the front and rear wheel contacts with the road. Since any vibration (or wave) in the chain will also cause the magnetic field to vary, then likewise to how chain speed is measured, the vibration can be measured. Since all mechanical vibration will depend on the nature of the material (specifically linear mass density) and the force it takes to move it from its undisturbed resting position (its tension), measuring this vibration can provide the information needed to establish the forces acting on the bike chain. The dominant force in the chain is due to the chain tension caused by the cyclist applying a force to the bike pedals. The useful parameters of this vibration, derived from measured sensor voltage and calculation, are amplitude, frequency and/or wave speed (see FIG. 4 classical physics of a string).

Bike Speed:

Because the energy for excitation of the chain comes mostly from road vibration originating from the front and rear wheel contacts with the road and because each wheel passes over the same ground, the time difference between the vibration coming the wheels can be extracted from the chain vibration using time autocorrelation. By computing at what delta time the autocorrelation is significantly larger near the expected value of the delta time and by the system knowledge of the separation of the wheels, the speed of the bike can be derived:

Speed=(delta time)×(distance of front to rear wheel span)

System Design:

This sensor will be part of a larger system consisting of two subsystems, subsystem one that consists of the components residing on the front derailleur attachment. These components consist of the vibration sensors and supporting electronics—the signal conditioners, digital to analog converters, locally derailleur mounted low-power computational unit and either USB or Bluetooth transceiver for Smartphone communication (subsystem two). Sensor data will be analyzed in real-time using both frequency-time spectral power and time domain correlations. This sensor device will be able to be used to measure not only power but possibly also bike speed and gear position. The system will exploit known characteristics of a pedal power vehicle—namely the cyclically varying torque that the cyclist legs delivers through the pedal crank. The system will also make use of the Smartphones access to elevation geographic data to calibrate the system to account for the unique vibrational parameter of the particular bike where the device is used.

Use:

Thus by using these measurements, which give chain speed and tension (a force), the sensor serves to enable measurement of the power output (calories per minute, horsepower, watts . . . etc) by the cyclist. The cyclist could see this power output, with the assistance of a microcontroller, which digitizes and analyzes these measurements, on an electronic display mounted on the bike handle bars. Both microcontroller and electronic display would be attached to the bicycle. The system could optionally be used to determine gear selection using the relative measured speeds of the chain and bike ground speed.

DEFINITION OF TERMS

Device: The term "device" refers to the Front Derailleur attachment, with its vibration sensors and small signal processing in smart phone communication electronics along with the Smartphone.

ADAC: Analog to Digital Converter.

System The term "system" refers to the combination of the "device", defined above, along with the Smartphone and application software which processes and displays the device signal.

Magneto Cyclist Power Sensor: The phrase, and title of this patent, "Magneto Cyclist Power Sensor" refers to both the sensor (FIG. 2) and the ideas for the smartphone application which displays the power output, the bike speed and assists in the power measurement calibration.

Subsystem One: The term "subsystem one" refers to the same components as the term "device".

Subsystem Two: The term "subsystem two" refers to the cyclists smartphone in the installed application used to support the sensor (device or subsystem one).

Sensor: This term is synonymous with device—the component displayed in FIG. 2.

Vibration: This term is used liberally to mean either standing wave motion, traveling wave motion or a combination in the chain. It may also refer to the vibration in the bike frame.

The invention claimed is:

1. A device, mounted on a bicycle front derailleur comprised of a plurality of vibration sensors and an associated electronic measurement and signal processing unit, which computes sensors signal time correlations,
    wherein, wave speed and tension transmitted by the chain is determined by calculating a chain and a bike vibrations signal time correlation, and
    wherein, using the tension measurement, the device computes the force and torque applied by the pedals.

2. The device in claim 1, with measurement of auto time correlation of assembly sensor computes the time difference of forced vibration of front and rear wheel of bike, as it travels over typical irregularities of a road surface, and thereby determines the bike speed.

3. The device of claim 2, by the additional measured chain speed, determines both the sprocket selection on the bike using the relative speed of the chain to the ground speed of the bike, and the power transmitted by the chain, by multiplying the chain speed with the tension computed.

4. The device of claim 3, by the additional measurement of chain speed, determines the power delivered by the chain by computing the product of chain speed and chain tension.

\* \* \* \* \*